United States Patent
Gallez et al.

(10) Patent No.: US 11,214,036 B2
(45) Date of Patent: Jan. 4, 2022

(54) FIBERS AND NONWOVEN MATERIALS PREPARED THEREFROM

(71) Applicant: ExxonMobil Chemical Patents Inc., Baytown, TX (US)

(72) Inventors: Vincent B. Gallez, Ottignies—Louvain la Neuve (BE); Galen C. Richeson, Humble, TX (US); Prasadarao Meka, Seabrook, TX (US); John W. M. Roberts, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 8 days.

(21) Appl. No.: 14/786,781

(22) PCT Filed: Jun. 12, 2014

(86) PCT No.: PCT/US2014/042119
§ 371 (c)(1),
(2) Date: Oct. 23, 2015

(87) PCT Pub. No.: WO2014/204778
PCT Pub. Date: Dec. 24, 2014

(65) Prior Publication Data
US 2016/0082690 A1    Mar. 24, 2016

Related U.S. Application Data

(60) Provisional application No. 61/836,505, filed on Jun. 18, 2013.

(51) Int. Cl.
*D04H 3/00* (2012.01)
*B32B 5/02* (2006.01)
(Continued)

(52) U.S. Cl.
CPC .............. *B32B 5/022* (2013.01); *C08L 23/10* (2013.01); *D01F 6/30* (2013.01); *D01F 6/46* (2013.01);
(Continued)

(58) Field of Classification Search
CPC ............ B32B 5/022; B32B 2262/0253; B32B 2555/02; C08L 23/10; D04H 3/007; D04H 3/00; D10B 2401/063; D10B 2509/02
(Continued)

(56) References Cited

U.S. PATENT DOCUMENTS

| 3,338,992 A | 8/1967 | Kinney |
| 3,341,394 A | 9/1967 | Kinney |

(Continued)

FOREIGN PATENT DOCUMENTS

| WO | WO 2004/014998 | 2/2004 |
| WO | WO 2005/111282 | 11/2005 |

(Continued)

OTHER PUBLICATIONS

H. N. Cheng, Macromolecules, vol. 17, pp. 1950-1955 (1984).
(Continued)

*Primary Examiner* — Matthew D Matzek

(57) ABSTRACT

Described herein are fibers, nonwoven fabrics, and other nonwoven articles comprising a blend of at least one propylene-based elastomer and a broad molecular weight polypropylene or a broad molecular weight impact copolymer. The broad molecular weight polypropylene has a molecular weight distribution (MWD) of greater than 4.5. The impact copolymer is a reactor blend and comprises a propylene homopolymer component and a copolymer component, where the propylene homopolymer component has a molecular weight distribution (MWD) of greater than 4.5.

14 Claims, 1 Drawing Sheet

(51) Int. Cl.
*C08L 23/10* (2006.01)
*D04H 3/007* (2012.01)
*D01F 6/30* (2006.01)
*D01F 6/46* (2006.01)
*D04H 1/4291* (2012.01)

(52) U.S. Cl.
CPC ........... *D04H 1/4291* (2013.01); *D04H 3/007* (2013.01); *B32B 2262/0253* (2013.01); *B32B 2555/02* (2013.01); *D10B 2401/063* (2013.01); *D10B 2509/02* (2013.01)

(58) Field of Classification Search
USPC ..................... 442/327–329, 401; 428/364
See application file for complete search history.

(56) References Cited

U.S. PATENT DOCUMENTS

| | | | |
|---|---|---|---|
| 3,502,763 A | 3/1970 | Hartmann | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 4,340,563 A | 7/1982 | Appel et al. | |
| 4,379,759 A | 4/1983 | Goeke et al. | |
| 5,770,753 A | 6/1998 | Kuber et al. | |
| 6,087,459 A | 7/2000 | Miro et al. | |
| 6,248,833 B1 | 6/2001 | Colucci | |
| 6,268,203 B1 | 7/2001 | Johnson et al. | |
| 6,440,882 B1 | 8/2002 | Colucci | |
| 6,525,157 B2 | 2/2003 | Cozewith et al. | |
| 6,881,800 B2 | 4/2005 | Friedersdorf | |
| 7,232,871 B2 | 6/2007 | Datta et al. | |
| 7,319,122 B2 * | 1/2008 | Cheng | C08L 23/12 525/191 |
| 7,601,666 B2 | 10/2009 | Rix et al. | |
| 7,803,876 B2 | 9/2010 | Yeh et al. | |
| 8,013,069 B2 | 9/2011 | Harrington et al. | |
| 8,026,323 B2 | 9/2011 | Datta et al. | |
| 2002/0019507 A1 | 2/2002 | Karandinos et al. | |
| 2005/0130544 A1 | 6/2005 | Cheng et al. | |
| 2006/0008643 A1 | 1/2006 | Lin et al. | |
| 2006/0135699 A1 | 6/2006 | Li et al. | |
| 2008/0172840 A1 | 7/2008 | Kacker et al. | |
| 2009/0124154 A1 | 5/2009 | Harrington et al. | |
| 2009/0149605 A1 | 6/2009 | Li et al. | |
| 2009/0311938 A1 | 12/2009 | Campbell et al. | |
| 2010/0105848 A1 | 4/2010 | Meka et al. | |
| 2010/0124864 A1 | 5/2010 | Dharmarajan et al. | |
| 2011/0081529 A1 | 4/2011 | Richeson et al. | |
| 2011/0207888 A1 | 8/2011 | Kolb et al. | |
| 2011/0253152 A1 | 10/2011 | Lin et al. | |
| 2011/0306731 A1 * | 12/2011 | Chou | C08L 23/10 525/240 |
| 2012/0123374 A1 | 5/2012 | Richeson et al. | |
| 2013/0165008 A1 | 6/2013 | Gallez et al. | |

FOREIGN PATENT DOCUMENTS

| | | |
|---|---|---|
| WO | WO 2009/064583 | 5/2009 |
| WO | 2010/039579 | 4/2010 |
| WO | WO 2010/098792 | 9/2010 |
| WO | 2011/102946 | 8/2011 |
| WO | WO 2013/095804 | 6/2013 |

OTHER PUBLICATIONS

L.M. Wheeler and J.N. Willis, Applied Spectroscopy, vol. 47, pp. 1128-1130, (1993).
*Liquid Chromatography of Polymers and Related Materials, III*, J. Cazes, Editor, Marcel Dekker, Inc., p. 207, (1981).

* cited by examiner

FIBERS AND NONWOVEN MATERIALS PREPARED THEREFROM

PRIORITY CLAIM TO RELATED APPLICATIONS

This application is a National Stage Application of International Application No. PCT/US2014/042119, filed Jun. 12, 2014, which claims the benefit of 61/836,505, filed Jun. 18, 2013, the disclosures of which are fully incorporated herein by reference in their entirety.

FIELD OF THE INVENTION

This invention relates to blends comprising propylene-based elastomers and to fibers and nonwoven materials prepared therefrom.

BACKGROUND OF THE INVENTION

The use of various thermoplastic resins to make fibers and fabrics is well known. In particular, propylene-based polymers and copolymers (sometimes referred to as propylene-based elastomers) are well known in the art for their usefulness in a variety of applications, including the manufacture of nonwoven fabrics. Such fabrics have a wide variety of uses, such as in medical and hygiene products, clothing, filter media, and sorbent products. Nonwoven fabrics are particularly useful in hygiene products, such as baby diapers, adult incontinence products, and feminine hygiene products. An important aspect of these fabrics, particularly in hygiene applications, is the ability to produce aesthetically pleasing fabrics, i.e., fabrics that are soft to the touch, and that have good leakage performance, i.e., fabrics that are stretchable and conform to the body of the wearer.

Propylene impact copolymers are commonly used in applications where strength and impact resistance is desired such as in molded and extruded automobile parts, household appliances, luggage, and furniture. Though often used to make films, propylene impact copolymers are not as commonly used to make fibers and fabrics because impact resistance is often not a desired property for such applications. For fibers and fabrics, manufacturers focus on properties such as strength, processability, softness, and breathability. U.S. Pat. Nos. 6,248,833, 6,440,882, and 7,319,122, U.S. Patent Application Nos. 2009/0311938, 2009/0149605, and 2010/0124864, and PCT Application No. PCT/US2012/064592 describe fibers and fabrics prepared with impact copolymers.

In many hygiene applications, multilayer nonwoven materials or laminates are employed having at least one elastic core layer and at least one extensible facing layer, where the elastic layer provides the desired conformability and fit of the product (and therefore, good leakage performance) while the extensible facing layer provides the desired aesthetics. Propylene-based elastomers are often used to form the elastic layers, however, are often considered too rubbery in feel to provide the desired aesthetics needed for the facing layer. Therefore, the facing layers are often composed of bicomponent polymer blends where the blend components are arranged in a core/sheath structure. Such bicomponent blends may include homopolymers of propylene, homopolymers of ethylene, random propylene copolymers, and other propylene or ethylene-based polymers, and blends thereof. The formation of such bicomponent materials, however, adds complexity and expense to the nonwoven manufacturing processes. It would be desirable, then, to provide monocomponent nonwoven fibers and fabrics having good extensibility and softness in spunmelt processes.

SUMMARY OF THE INVENTION

Figure 1:
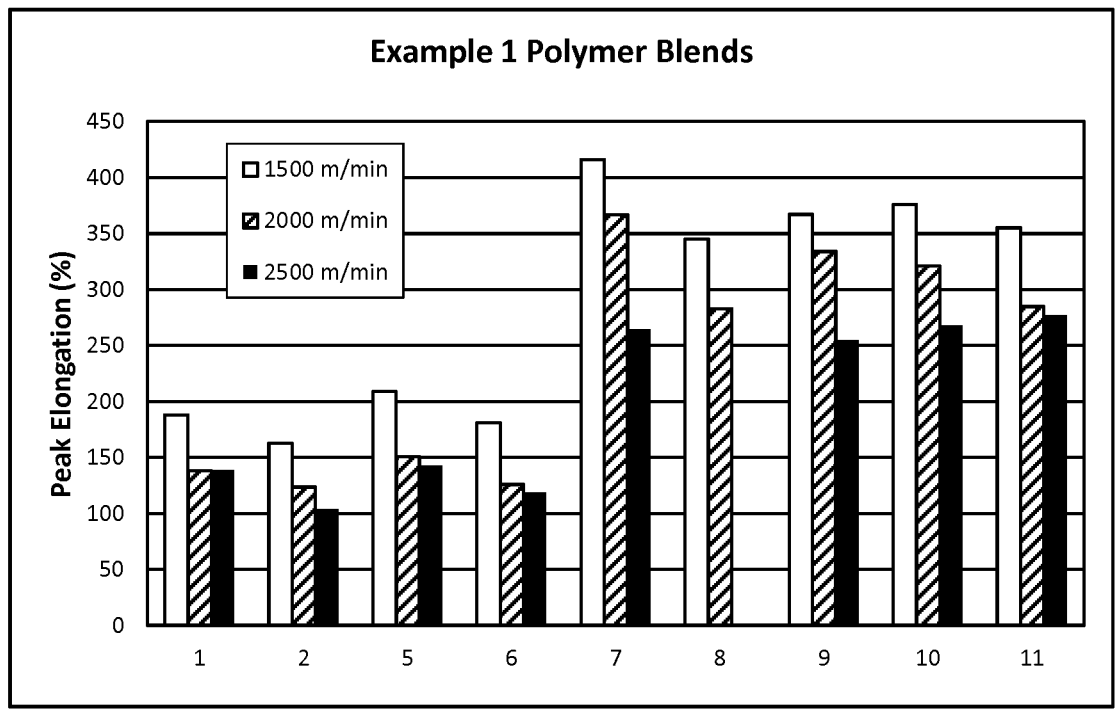
FIG. 1 illustrates the peak elongation of the fibers in Example 1.

Provided herein are fibers, nonwoven fabrics, and other nonwoven articles comprising a blend of at least one propylene-based elastomer and a broad molecular weight polypropylene or a broad molecular weight impact copolymer.

In some embodiments, the fiber may comprise a blend of from about 30 to about 85 wt % of a polypropylene homopolymer having a molecular weight distribution (Mw/Mn) ("MWD") of greater than 4.5 and from about 15 to about 70 wt % of a propylene-based elastomer, wherein the propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g.

In some embodiments, the fiber may comprise a blend of from about 30 to about 85 wt % of an impact copolymer and from about 15 to about 70 wt % of a propylene-based elastomer. The impact copolymer is a reactor blend and comprises a propylene homopolymer component and a copolymer component, where the propylene homopolymer component has a MWD of greater than 4.5, and where the copolymer component comprises from about 20 to about 80 wt % propylene-derived units and from about 20 to about 80 wt % ethylene-derived units. The propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g.

DETAILED DESCRIPTION OF THE INVENTION

Fibers, nonwoven fabrics, and other nonwoven articles comprising a blend of at least one propylene-based elastomer and a broad molecular weight polypropylene or a broad molecular weight impact copolymer are provided herein, as well as methods for forming the same.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Polypropylene," as used herein, includes homopolymers and copolymers of propylene or mixtures thereof. Products that include one or more propylene monomers polymerized with one or more additional monomers may be more commonly known as random copolymers (RCP) or impact copolymers (ICP) Impact copolymers may also be known in the art as heterophasic copolymers. "Propylene-based," as used herein, is meant to include any polymer comprising propylene, either alone or in combination with one or more comonomers, in which propylene is the major component (i.e., greater than 50 wt % propylene).

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure, however, reactor grade polymers include those polymers that are reactor blends.

"Reactor blend," as used herein, means a highly dispersed and mechanically inseparable blend of two or more polymers produced in situ. For example, a reactor blend polymer may be the result of a sequential (or series) polymerization process where a first polymer component is produced in a first reactor and a second polymer component is produced in a second reactor in the presence of the first polymer component. Alternatively, a reactor blend polymer may be the result of a parallel polymerization process where the polymerization effluent containing the polymer components made in separate parallel reactors are solution blended to form the final polymer product. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

"Visbreaking," as used herein, is a process for reducing the molecular weight of a polymer by subjecting the polymer to chain scission. The visbreaking process also increases the MFR of a polymer and may narrow its molecular weight distribution. Several different types of chemical reactions can be employed for visbreaking propylene-based polymers. An example is thermal pyrolysis, which is accomplished by exposing a polymer to high temperatures, e.g., in an extruder at 270° C. or higher. Other approaches are exposure to powerful oxidizing agents and exposure to ionizing radiation. A commonly used method of visbreaking is the addition of a prodegradant to the polymer. A prodegradant is a substance that promotes chain scission when mixed with a polymer, which is then heated under extrusion conditions. Examples of prodegradants used in commercial practice are alkyl hydroperoxides and dialkyl peroxides. These materials, at elevated temperatures, initiate a free radical chain reaction resulting in scission of polypropylene molecules. The terms "prodegradant" and "visbreaking agent" are used interchangeably herein. Polymers that have undergone chain scission via a visbreaking process are said herein to be "visbroken." Such visbroken polymer grades, particularly polypropylene grades, are often referred to in the industry as "controlled rheology" or "CR" grades.

"Catalyst system," as used herein, means the combination of one or more catalysts with one or more activators and, optionally, one or more support compositions. An "activator" is any compound or component, or combination of compounds or components, capable of enhancing the ability of one or more catalysts to polymerize monomers to polymers.

As used herein, "nonwoven fabric" means a web structure of individual fibers or filaments that are interlaid, but not in an identifiable manner as in a knitted fabric.

Broad Molecular Weight Polypropylene

In some embodiments, the polymer blend may comprise a broad molecular weight distribution polypropylene ("BMWDPP"). The BMWDPP is preferably a propylene homopolymer, and preferably an isotactic propylene homopolymer, although in some embodiments small amounts of a comonomer may be used to obtain particular properties. Typically, such copolymers contain less than 10 wt %, or less than 6 wt %, or less than 4 wt %, or less than 2 wt %, or less than 1 wt % of a comonomer such as ethylene, butene, hexene or octene. In some embodiments, the BMWDPP consists essentially of propylene-derived units and does not contain any comonomer except that which may be present due to impurities in the propylene feed stream. In some embodiments, the BMWDPP consists only of propylene-derived units.

The BMWDPP has a broad molecular weight distribution, Mw/Mn ("MWD"), of greater than 4.5, or greater than 5.0, or greater than 5.5, or greater than 6.0. Preferably, the BMWDPP has a MWD of less than 15.0, or less than 14.0, or less than 13.0, or less than 12.0, or less than 11.0, or less than 10.0, or less than 9.5, or less than 9.0. In some embodiments, the BMWDPP has a MWD in the range of from 4.5 to 15.0, or in the range of from 4.5 to 12.0, or in the range of from 5.0 to 10.0, or in the range of from 6.0 to 9.0. In certain embodiments, these molecular weight distributions are obtained in the absence of visbreaking using peroxide or other post reactor treatment designed to reduce molecular weight.

In some embodiments, the BMWDPP may have a Mz/Mw ratio of greater than or equal to 2.5, or greater than or equal to 2.6, or greater than or equal to 2.7, or greater than or equal to 2.8, or greater than or equal to 2.9, or greater than or equal to 3.0, or greater than or equal to 3.1, or greater than or equal to or equal to 3.2. The BMWDPP may have a Mz/Mw ratio of less than or equal to 7.0, or less than or equal to 6.5, or less than or equal to 6.0, or less than or equal to 5.5, or less than or equal to 5.0.

As used herein, MWD is determined according to methods well known in the art, for example by GPC (Gel Permeation Chromatography) on a Waters 150 gel permeation chromatograph equipped with a differential refractive index (DRI) detector and a Chromatix KMX-6 on line light scattering photometer. The system is used at 135° C. with 1,2,4-trichlorobenzene as the mobile phase using Shodex (Showa Denko America, Inc.) polystyrene gel columns 802, 803, 804, and 805. This technique is discussed in "Liquid Chromatography of Polymers and Related Materials III," J. Cazes editor, Marcel Dekker, 1981, p. 207, which is incorporated herein by reference. No corrections for column spreading are employed; however, data on generally accepted standards, e.g., National Bureau of Standards Polyethylene 1484 and anionically produced hydrogenated polyisoprenes (alternating ethylene-propylene copolymers) demonstrate that such corrections on MWD are less than 0.05 units. $M_w$, $M_n$, and $M_z$ are calculated from elution times. The numerical analyses are performed using the commercially available Beckman/CIS customized low-angle laser-light scattering ("LALLS") software in conjunction with the standard Gel Permeation package. Reference to $M_w/M_n$ implies that the $M_w$ is the value reported using the LALLS detector and $M_n$ is the value reported using the DRI detector described above.

The BMWDPP may have a weight average molecular weight (Mw, as determined by GPC) of less than 400,000, or less than 350,000, or less than 300,000, or less than 275,000, or less than 250,000.

The BMWDPP may have a melting point (Tm) of at least 135° C., or at least 150° C., or at least 155° C., or at least 160° C. The melting point may be determined by differential scanning calorimetry as described in more detail below.

The melt flow rate ("MFR") of the BMWDPP may range from about 10 to about 500 g/10 min, or from about 12 to about 200 g/10 min, or from about 15 to about 175 g/10 min, or from about 20 to about 160 g/10 min, or from about 25 to about 150 g/10 min, or from about 30 to about 100 g/10 min. The MFR may be determined by ASTM-1238 (measured at load of 2.16 kg and 230° C.).

A variety of additives may be incorporated into the BMWDPP for various purposes. For example, such additives include, but are not limited to, stabilizers, antioxidants, fillers, colorants, nucleating agents, and mold release agents. Primary and secondary antioxidants include, for example, hindered phenols, hindered amines, and phosphates. Nucleating agents include, for example, sodium benzoate and talc. Dispersing agents such as Acrowax C can also be included. Slip agents include, for example, oleamide and erucamide. Catalyst deactivators are also commonly used, for example, calcium stearate, hydrotalcite, and calcium oxide.

The BMWDPP compositions suitable for use in the present invention may be prepared by conventional polymerization techniques. For example, the BMWDPP may be produced using a liquid slurry or solution polymerization process. In one or more embodiments, hydrogen may be added to the reactor to control molecular weight and/or MFR of the BMWDPP. The use of hydrogen for such purposes is well known to those skilled in the art.

In some embodiments, the BMWDPP is prepared using a Ziegler-Natta catalyst system with a blend of electron donors. For example, the BMWDPP may be prepared using a succinate Ziegler-Natta type catalyst system.

In other embodiments, metallocene-based catalyst systems may also be used to produce the BMWDPP. Suitable metallocenes may include those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 are suitable.

It has been found that the BMWDPPs described above are particularly useful for producing fibers, nonwoven fabrics, and multilayer laminates when blended with one or more propylene-based elastomers (PBEs) as described below.

Impact Copolymers

The impact copolymers ("ICPs") useful for making the fibers and fabrics described herein comprise at least two components, Component A and Component B. Component A is preferably a propylene homopolymer and Component B is preferably a copolymer comprising propylene and comonomer.

In preferred embodiments, Component A is a propylene homopolymer, and preferably an isotactic propylene homopolymer, although small amounts of a comonomer may be used to obtain particular properties. Typically such copolymers contain less than 10 wt %, or less than 6 wt %, or less than 4 wt %, or less than 2 wt %, or less than 1 wt % of comonomer such as ethylene, butene, hexene, or octene. Preferably, the polymer component of Component A consists essentially of propylene-derived units and does not contain any comonomer except that which may be present due to impurities in the propylene feed stream. In some embodiments, Component A consists only of propylene-derived units.

Component A has a broad molecular weight distribution, Mw/Mn ("MWD"), of greater than 4.5, or greater than 5.0, or greater than 5.5, or greater than 6.0. Preferably, Component A has a MWD of less than 15.0, or less than 14.0, or less than 13.0, or less than 12.0, or less than 11.0, or less than 10.0, or less than 9.5, or less than 9.9. In some embodiments, Component A has a MWD in the range of from 4.5 to 15.0, or in the range of from 4.5 to 12.0, or in the range of from 5.0 to 10.0, or in the range of from 6.0 to 9.0. In certain embodiments, these molecular weight distributions are obtained in the absence of visbreaking using peroxide or other post reactor treatment designed to reduce molecular weight.

In some embodiments, Component A may have a Mz/Mw ratio of greater than or equal to 2.5, or greater than or equal to 2.6, or greater than or equal to 2.7, or greater than or equal to 2.8, or greater than or equal to 2.9, or greater than or equal to 3.0, or greater than or equal to 3.1, or greater than or equal to 3.2. Component A may have a Mz/Mw ratio of less than or equal to 7.0, or less than or equal to 6.5, or less than or equal to 6.0, or less than or equal to 5.5, or less than or equal to 5.0.

Component A may have a weight average molecular weight (Mw, as determined by GPC) of less than 400,000, or less than 350,000, or less than 300,000, or less than 275,000, or less than 250,000.

Component A may have a melting point (Tm) of at least 150° C., preferably at least 155° C., most preferably at least 160° C. The melting point may be determined by differential scanning calorimetry (DSC), by taking a sample weight of 5-7 mg polymer and melting completely the polymer at 200° C. for a minute and then cooling at 10° C./min and recording the crystallization temperature, followed by melting endotherm under second heating cycle.

The melt flow rate ("MFR") of Component A may range from about 10 to about 500 g/10 min, or from about 12 to about 200 g/10 min, or from about 15 to about 175 g/10 min, or from about 20 to about 160 g/10 min, or from about 14 to about 150 g/10 min, or from about 30 to about 100 g/10 min. The MFR may be determined by ASTM-1238 measured at load of 2.16 kg and 230° C.

In preferred embodiments, Component B is a copolymer comprising propylene-derived units and comonomer-derived units. The comonomer is preferably ethylene, although other propylene copolymers or terpolymers may be suitable depending on the particular product properties desired. For example propylene/butene, hexene, or octene copolymers may be used.

Component B preferably comprises at least 30 wt % propylene, or at least 35 wt % propylene, or at least 40 wt % propylene, or at least 45 wt % propylene, or at least 50 wt % propylene, or at least 60 wt % propylene. Component B may comprise less than 90 wt % propylene, or less than 85 wt % propylene, or less than 80 wt % propylene, or less than 75 wt % propylene, or less than 70 wt % propylene, or less than 65 wt % propylene. In some embodiments, Component B comprises from about 30 to about 80 wt % propylene, or from about 35 to about 70 wt % propylene, or from about 40 to about 65 wt % propylene.

Component B preferably comprises at least 20 wt % comonomer, or at least 25 wt % comonomer, or at least 30 wt % comonomer, or at least 35 wt % comonomer, or at least 40 wt % comonomer, or at least 45 wt % comonomer. Component B may comprises less than 85 wt % comonomer, or less than 80 wt % comonomer, or less than 75 wt % comonomer, or less than 70 wt % comonomer, or less than 65 wt % comonomer, or less than 60 wt % comonomer, or less than 55 wt % comonomer. In some embodiments, Component B comprises from about 20 to about 80 wt % comonomer, or from about 25 to about 75 wt % comonomer, or from about 30 to about 70 wt % comonomer, or from about 35 to about 65 wt % comonomer, or from 40 to 60 wt % comonomer, or from 45 to 55 wt % comonomer. In certain embodiments, Component B may consist essentially of, or consist only of, propylene and ethylene-derived units in the above described amounts.

In one or more embodiments, Component B may have an intrinsic viscosity greater than 1.00 dl/g, or greater than 1.50 dl/g, or greater than 1.75 dl/g. Component B may have an intrinsic viscosity of less than 5.00 dl/g, or less than 4.00 dl/g, or less than 3.50 dl/g. The term "intrinsic viscosity" or "IV" is used herein to mean the viscosity of a solution of polymer such as Component B in a given solvent at a given temperature, when the polymer composition is at infinite dilution. According to the ASTM D1601 standard, IV measurement utilizes a standard capillary viscosity measuring device, in which the viscosity of a series of concentrations of the polymer in the solvent at a given temperature are determined. For Component B, decalin is a suitable solvent and a typical temperature is 135° C. From the values of the viscosity of solutions of varying concentrations, the viscosity at infinite dilution can be determined by extrapolation.

The ICPs may comprise from about 40 to about 95 wt % Component A and from about 5 wt % to about 60 wt % Component B, or from about 50 wt % to about 90 wt % Component A and from about 10 wt % to about 50 wt % Component B, or from about 60 wt % to about 90 wt % Component A and from about 10 wt % to about 40 wt % Component B, or from about 70 wt % to about 85 wt % Component A and from about 15 wt % to about 30 wt % Component B, where desirable ranges may include ranges from any of the above described lower limits to any upper limit. In some embodiments, the ICP may consist essentially of Components A and B.

The overall comonomer (e.g., ethylene) content of the ICP may be in the range of from about 3 wt % to about 40 wt %, or from about 5 wt % to about 25 wt %, or from about 6 wt % to about 20 wt %, or from about 7 wt % to about 15 wt %, where desirable ranges may include ranges from any lower limit to any upper limit.

The melt flow rate ("MFR") of the ICPs suitable for use herein may range from about 5 to about 1000 g/10 min, or from about 10 to about 750 g/10 min, or from about 15 to about 500 g/10 min, or from about 20 to about 250 g/10 min, or from about 25 to about 100 g/10 min, or from about 30 to 60 g/10 min, where desirable ranges may include ranges from any lower limit to any upper limit. The MFR may be determined by ASTM-1238 measured at load of 2.16 kg and 230° C.

The ICPs suitable for use in the polymer blends of the present invention may, in some embodiments, be reactor blends, meaning that Components A and B are not physically or mechanically blended together after polymerization but are interpolymerized in at least one reactor, often in two or more reactors in series. The final ICP as obtained from the reactor or reactors, however, can be blended with various other components including other polymers or additives. In other embodiments, however, the ICPs described herein may be formed by producing Components A and B in separate reactors and physically blending the components once they have exited their respective reactors.

In one or more embodiments herein, the ICPs may be described as "heterophasic." As used herein, heterophasic means that the polymers have two or more phases. Commonly, heterophasic ICPs comprise a matrix component in one phase and a second rubber component phase dispersed within the matrix. In one or more embodiments herein, the ICPs comprise a matrix phase comprising a propylene homopolymer (Component A) and a dispersed phase comprising a propylene-ethylene copolymer (Component B). The copolymer component (Component B) has rubbery characteristics and provides impact resistance, while the matrix component (Component A) provides overall stiffness.

A variety of additives may be incorporated into the ICP for various purposes. For example, such additives include, but are not limited to, stabilizers, antioxidants, fillers, colorants, nucleating agents, and mold release agents. Primary and secondary antioxidants include, for example, hindered phenols, hindered amines, and phosphates. Nucleating agents include, for example, sodium benzoate, and talc. Dispersing agents such as Acrowax C can also be included. Slip agents include, for example, oleamide, and erucamide. Catalyst deactivators are also commonly used, for example, calcium stearate, hydrotalcite, and calcium oxide.

The ICP compositions suitable for use in the present invention may be prepared by conventional polymerization techniques. For example, the ICP may be produced using a two-step gas phase process using Ziegler-Natta catalysis, an example of which is described in U.S. Pat. No. 4,379,759. The ICPs for use in the invention may also be produced in reactors operated in series. In such series operations, the first polymerization (polymerization of Component A) may be a liquid slurry or solution polymerization process, and the second polymerization (polymerization of Component B) may be carried out in the gas phase. In one or more embodiments, hydrogen may be added to one or both reactors to control molecular weight, IV, and/or MFR. The use of hydrogen for such purposes is well known to those skilled in the art.

In some embodiments, the ICP is prepared using a Ziegler-Natta catalyst system with a blend of electron donors as described in U.S. Pat. No. 6,087,459 or U.S. Patent Application Publication No. 2010/0105848. In some embodiments, the ICP may be prepared using a succinate Ziegler-Natta type catalyst system.

Metallocene-based catalyst systems may also be used to produce the ICP compositions described herein. Current particularly suitable metallocenes are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 are suitable.

It has been found that the ICPs described above are particularly useful for producing fibers, nonwoven fabrics, and multilayer laminates when blended with one or more propylene-based elastomers (PBEs) as described below.

Propylene-Based Elastomers

The polymer blends used to form the fibers and fabrics described herein comprise one or more propylene-based elastomers ("PBEs"). The PBE comprises propylene and from about 5 to about 25 wt % of one or more comonomers selected from ethylene and/or $C_4$-$C_{12}$ α-olefins. The α-olefin comonomer units may be derived from ethylene, butene, pentene, hexene, 4-methyl-1-pentene, octene, or decene. In preferred embodiments the α-olefin is ethylene. In some embodiments, the propylene-based polymer composition consists essentially of propylene and ethylene, or consists only of propylene and ethylene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

The PBE may include at least about 5 wt %, at least about 6 wt %, at least about 7 wt %, or at least about 8 wt %, or at least about 9 wt %, or at least about 10 wt %, or at least about 12 wt % ethylene-derived units, where the percentage by weight is based upon the total weight of the propylene-derived and ethylene-derived units. The PBE may include up to about 30 wt %, or up to about 25 wt %, or up to about 22 wt %, or up to about 20 wt %, or up to about 19 wt %, or up to about 18 wt %, or up to about 17 wt % ethylene-derived units, where the percentage by weight is based upon the total weight of the propylene-derived and ethylene-derived units. In some embodiments, the PBE may comprise from about 5 wt % to about 25 wt % ethylene-derived units, or from about 7 wt % to about 20 wt % ethylene, or from about 9 wt % to about 18 wt % ethylene-derived units, where the percentage by weight is based upon the total weight of the propylene-derived and ethylene-derived units.

The PBE may include at least about 70 wt %, or at least about 75 wt %, or at least about 80 wt %, or at least about 81 wt % propylene-derived units, or at least about 82 wt %, or at least about 83 wt % propylene-derived units, where the percentage by weight is based upon the total weight of the propylene-derived and α-olefin derived units. The PBE may include up to about 95 wt %, or up to about 94 wt %, or up to about 93 wt %, or up to about 92 wt %, or up to about 90 wt %, or up to about 88 wt % propylene-derived units, where the percentage by weight is based upon the total weight of the propylene-derived and α-olefin derived units.

The PBEs of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. The Tm of the PBE (as determined by DSC) may be less than about 115° C., or less than about 110° C., or less than about 100° C., or less than about 95° C., or less than about 90° C. In some embodiments, the PBE may have two melting peaks as determined by DSC. In other embodiments, the PBE may have a single melting peak as determined by DSC.

The PBE may be characterized by its heat of fusion (Hf), as determined by DSC. The PBE may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. The PBE may be characterized by an Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g, or less than 25 J/g.

As used within this specification, DSC procedures for determining Tm and Hf include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is heated at 10° C./min to attain a final temperature of about 200° C. The sample is kept at 200° C. for 5 minutes. Then a second cool-heat cycle is performed. Events from both cycles are recorded. The thermal output is recorded as the area under the melting peak of the sample, which typically occurs between about 0° C. and about 200° C. It is measured in Joules and is a measure of the Hf of the polymer.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, or from about 80 to about 99%, or from about 85 to about 99%, or from about 90 to about 99%, or from about 90 to about 97%, or from about 80 to about 97%, where desirable ranges may include ranges from any lower limit to any upper limit Triad tacticity is determined by the methods described in U.S. Pat. No. 7,232,871.

The PBE may have a tacticity index m/r ranging from a lower limit of 4 or 6 to an upper limit of 8 or 10 or 12. The tacticity index, expressed herein as "m/r", is determined by $^{13}C$ nuclear magnetic resonance ("NMR"). The tacticity index, m/r, is calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The PBE may have a % crystallinity of from about 0.5% to about 40%, or from about 1% to about 30%, or from about 5% to about 25%, where desirable ranges may include ranges from any lower limit to any upper limit, determined according to DSC procedures. Crystallinity may be determined by dividing the Hf of a sample by the Hf of a 100% crystalline polymer, which is assumed to be 189 J/g for isotactic polypropylene or 350 J/g for polyethylene.

The PBE may have a density of from about 0.85 g/cm³ to about 0.92 g/cm³, or from about 0.86 g/cm³ to about 0.90 g/cm³, or from about 0.86 g/cm³ to about 0.89 g/cm³ at room temperature, as measured per the ASTM D-792 test method, where desirable ranges may include ranges from any lower limit to any upper limit.

The PBE can have a melt index (MI) (ASTM D-1238, 2.16 kg @ 190° C.), of less than or equal to about 100 g/10 min, or less than or equal to about 50 g/10 min, or less than or equal to about 25 g/10 min, or less than or equal to about 10 g/10 min, or less than or equal to about 9.0 g/10 min, or less than or equal to about 8.0 g/10 min, or less than or equal to about 7.0 g/10 min.

The PBE may have a melt flow rate (MFR), as measured according to ASTM D-1238 (2.16 kg weight @ 230° C.), greater than about 1 g/10 min, or greater than about 2 g/10 min, or greater than about 5 g/10 min, or greater than about 8 g/10 min, or greater than about 10 g/10 min. The PBE may have an MFR less than about 500 g/10 min, or less than about 400 g/10 min, or less than about 300 g/10 min, or less than about 200 g/10 min, or less than about 100 g/10 min, or less than about 75 g/10 min, or less than about 50 g/10 min. In some embodiments, the PBE may have an MFR from about 1 to about 100 g/10 min, or from about 2 to about 75 g/10 min, or from about 5 to about 50 g/10 min.

In some embodiments, the PBE may be a reactor grade polymer, as defined above. In other embodiments, the PBE may be a polymer that has been visbroken after exiting the reactor to increase the MFR. "Visbreaking" as used herein is a process for reducing the molecular weight of a polymer by subjecting the polymer to chain scission. The visbreaking process also increases the MFR of a polymer and may narrow its molecular weight distribution.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the polymer and $\eta_l$ is the intrinsic viscosity of a linear polymer of the same viscosity-averaged molecular weight (Mv) as the polymer. $\eta_l = KM_v^\alpha$, K and $\alpha$ are measured values for linear polymers and should be obtained on the same instrument as the one used for the g' index measurement.

The PBE may have a weight average molecular weight (Mw) of from about 50,000 to about 5,000,000 g/mol, or from about 75,000 to about 1,000,000 g/mol, or from about 100,000 to about 500,000 g/mol, or from about 125,000 to about 300,000 g/mol, where desirable ranges may include ranges from any lower limit to any upper limit.

The PBE may have a number average molecular weight (Mn) of from about 2,500 to about 2,500,000 g/mole, or from about 5,000 to about 500,000 g/mole, or from about 10,000 to about 250,000 g/mole, or from about 25,000 to about 200,000 g/mole, where desirable ranges may include ranges from any lower limit to any upper limit.

The PBE may have a Z-average molecular weight (Mz) of from about 10,000 to about 7,000,000 g/mole, or from about 50,000 to about 1,000,000 g/mole, or from about 80,000 to about 700,000 g/mole, or from about 100,000 to about 500,000 g/mole, where desirable ranges may include ranges from any lower limit to any upper limit.

The molecular weight distribution (MWD, equal to Mw/Mn) of the PBE may be from about 1 to about 40, or from about 1 to about 15, or from about 1.8 to about 5, or from about 1.8 to about 3, where desirable ranges may include ranges from any lower limit to any upper limit.

Optionally, the propylene-based polymer compositions may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). Exemplary dienes include, but are not limited to, butadiene, pentadiene, hexadiene (e.g., 1,4-hexadiene), heptadiene (e.g., 1,6-heptadiene), octadiene (e.g., 1,6-octadiene, or 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of branched chain acyclic dienes include, but are not limited to, 5-methyl-1,4-hexadiene, 3,7-dimethyl-1,6-octadiene, and 3,7-dimethyl-1,7-octadiene. Examples of single ring alicyclic dienes include, but are not limited to, 1,4-cyclohexadiene, 1,5-cyclooctadiene, and 1,7-cyclododecadiene. Examples of multi-ring alicyclic fused and bridged ring dienes include, but are not limited to, tetrahydroindene; norbornadiene; methyltetrahydroindene; dicyclopentadiene; bicyclo(2.2.1)hepta-2,5-diene; and alkenyl-, alkylidene-, cycloalkenyl-, and cylcoalkylidene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to, vinyl cyclohexene, allyl cyclohexene, vinylcyclooctene, 4-vinylcyclohexene, allyl cyclodecene, vinylcyclododecene, and tetracyclododecadiene. In some embodiments of the present invention, the diene is selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based polymer compositions comprises a diene, the diene may be present at from 0.05 wt % to about 6 wt % diene-derived units, or from about 0.1 wt % to about 5.0 wt % diene-derived units, or from about 0.25 wt % to about 3.0 wt % diene-derived units, or from about 0.5 wt % to about 1.5 wt % diene-derived units, where the percentage by weight is based upon the total weight of the propylene-derived, alpha-olefin derived, and diene-derived units.

In one or more embodiments, the PBE can optionally be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, acrylates, or the like. Illustrative monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In one or more embodiments, the grafted PBE comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 1 to about 6 wt %, preferably at least about 0.5 wt %, and highly preferably about 1.5 wt %.

In some embodiments, the PBE is a reactor blend of a first polymer component and a second polymer component. Thus, the comonomer content of the PBE can be adjusted by adjusting the comonomer content of the first polymer component, adjusting the comonomer content of second polymer component, and/or adjusting the ratio of the first polymer component to the second polymer component present in the propylene-based polymer composition. In such embodiments, the first polymer component may comprise propylene and ethylene and have an ethylene content of greater than 10 wt % ethylene, or greater than 12 wt % ethylene, or greater than 13 wt % ethylene, or greater than 14 wt % ethylene, or greater than 15 wt % ethylene, and an ethylene content that is less than 20 wt % ethylene, or less than 19 wt % ethylene, or less than 18 wt % ethylene, or less than 17 wt % ethylene, or less than 16 wt % ethylene, where the percentage by weight is based upon the total weight of the propylene-derived and ethylene derived units of the first polymer component. In such embodiments, the second polymer component may comprise propylene and ethylene and have an ethylene content of greater than 2 wt % ethylene, or greater than 3 wt % ethylene, or greater than 4 wt % ethylene, or greater than 5 wt % ethylene, or greater than 6 wt % ethylene, and an ethylene content that is less than 10 wt % ethylene, or less than 9.0 wt % ethylene, or less than 8 wt % ethylene, or less than 7 wt % ethylene, or less than 6 wt % ethylene, or less than 5 wt % ethylene, where the percentage by weight is based upon the total weight of the propylene-derived and ethylene derived units of the second polymer component. In such embodiments, the PBE may comprise from 3-25 wt % of the second polymer component, or from 5-20 wt % of the second polymer component, or from 7-18 wt % of the second polymer component, or from 10-15 wt % of the second polymer component, and from 75 to 97 wt % of the first polymer component, or from 80 to 95 wt % of the first polymer component, or from 82 to 93 wt % of the first polymer component, or from 85 to 90 wt % of the first polymer component, based on the weight of the PBE, where desirable ranges may include ranges from any lower limit to any upper limit.

Preparation of Propylene-Based Elastomers

Polymerization of the PBE is conducted by reacting monomers in the presence of a catalyst system described herein at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used. Further description of exemplary methods suitable for preparation of the PBEs described herein may be found in U.S. Pat. Nos. 6,881,800; 7,803,876; 8,013,069; and 8,026,323.

The triad tacticity and tacticity index of the PBE may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences.

Too much comonomer may reduce the crystallinity provided by the crystallization of stereoregular propylene derived sequences to the point where the material lacks strength; too little and the material may be too crystalline. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157, whose test methods are also fully applicable for the various measurements referred to in this specification and claims and which contains more details on GPC measurements, the determination of ethylene content by NMR and the DSC measurements.

The catalyst may also control the stereoregularity in combination with the comonomer and the polymerization temperature. The PBEs described herein are prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Such catalyst systems may optionally include impurity scavengers.

The catalyst systems used for producing the PBE may comprise a metallocene compound. In some embodiments, the metallocene compound is a bridged bisindenyl metallocene having the general formula $(In^1)Y(In^2)MX_2$, where $In^1$ and $In^2$ are (preferably identical) substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. Exemplary metallocene compounds include, but are not limited to, μ-dimethyl-silylbis(indenyl)hafniumdimethyl and μ-dimethylsilylbis(indenyl)zirconiumdimethyl, and in particular (μ-dimethyl-silyl)bis(2-methyl-4-(3,'5'-di-tert-butylphenyl)indenyl)zirconiumdimethyl, (μ-dimethyl-silyl)bis(2-methyl-4-(3,'5'-di-tert-butylphenyl)indenyl)hafniumdimethyl, (μ-dimethyl-silyl)bis(2-methyl-4-naphthylindenyl)zirconiumdimethyl, (μ-dimethylsilyl)bis(2-methyl-4-naphthylindenyl)hafniumdimethyl, (μ-dimethylsilyl)bis(2-methyl-4-(N-carbazyl)indenyl)-zirconiumdimethyl, and (μ-dimethylsilyl)bis(2-methyl-4-(N-carbazyl)indenyl)-hafniumdimethyl.

Alternatively, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)-hafnium dimethyl, diphenylsilyl bis(5,5,8,8-tetramethyl-5,6,7,8-tetrahydrobenz(f)indenyl)-hafnium dimethyl, diphenylsilyl bis(2-(methyl)-5,5,8,8-tetramethyl-5,6,7,8-tetrahydrobenz(f) indenyl)zirconium dichloride, and cyclo-propylsilyl bis(2-(methyl)-5,5,8,8-tetramethyl-5,6,7,8-tetrahydrobenz(f) indenyl)hafnium dimethyl.

The activators of the catalyst systems used to produce PBE may comprise a cationic component. In some embodiments, the cationic component has the formula $[R^1R^2R^3AH]^+$, where A is nitrogen, $R^1$ and $R^2$ are together a $-(CH_2)_a-$ group, where a is 3, 4, 5, or 6, and form, together with the nitrogen atom, a 4-, 5-, 6-, or 7-membered non-aromatic ring to which, via adjacent ring carbon atoms, optionally, one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. In other embodiments, the cationic component has the formula $[R_nAH]^+$, where A is nitrogen, n is 2 or 3, and all R are identical and are $C_1$ to $C_3$ alkyl groups, such as, for example, trimethylammonium, trimethylanilinium, triethylammonium, dimethylanilinium, or dimethylammonium.

In one or more embodiments, the activators of the catalyst systems used to produce the propylene-based polymer compositions comprise an anionic component, $[Y]^-$. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl and perfluorobiphenyl.

Together, the cationic and anionic components of the catalysts systems described herein form an activator compound. In one or more embodiments of the present invention, the activator may be N,N-dimethylanilinium-tetra(perfluorophenyl)borate, N,N-dimethylanilinium-tetra(perfluoronaphthyl)borate, N,N-dimethylanilinium-tetrakis(perfluoro-biphenyl)borate, N,N-dimethylanilinium-tetrakis(3,5-bis(trifluoromethyl)phenyl)borate, triphenylcarbenium-tetra(perfluorophenyl)borate, triphenylcarbenium-tetra(perfluoro-naphthyl)borate, triphenylcarbenium-tetrakis(perfluorobiphenyl)borate, or triphenylcarbenium-tetrakis(3,5-bis(trifluoromethyl)phenyl)borate.

Any catalyst system resulting from any combination of a metallocene compound, a cationic activator component, and an anionic activator component mentioned in the preceding paragraphs shall be considered to be explicitly disclosed herein and may be used in accordance with the present invention in the polymerization of one or more olefin monomers. Also, combinations of two different activators can be used with the same or different metallocene(s).

Further, the catalyst systems may contain, in addition to the transition metal compound and the activator described above, additional activators (co-activators) and/or scavengers. A co-activator is a compound capable of reacting with the transition metal complex, such that when used in combination with an activator, an active catalyst is formed. Co-activators include alumoxanes and aluminum alkyls.

In some embodiments, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$) and the like. Exemplary aluminum alkyls include triethylaluminum, diethylaluminum chloride, ethylaluminum dichloride, tri-iso-butylaluminum, tri-n-octylaluminum, tri-n-hexyl aluminum, trimethylaluminum, and combinations thereof. Exemplary boron alkyls include triethylboron. Scavenging compounds may also be alumoxanes and modified alumoxanes including methylalumoxane and modified methylalumoxane.

Polymer Blends

Polymer blends according to the present invention may comprise at least one ICP, or at least one BMWDPP, and at least one PBE.

In embodiments where the blend comprises an ICP and a PBE, the blend may comprise from about 30 to about 85 wt % ICP, or from about 40 to about 80 wt % ICP, or from about 45 to about 80 wt % ICP, or from about 45 to about 75 wt % ICP, or from about 45 to about 70 wt % ICP, or from about 50 to about 65 wt % ICP, where desirable ranges may include ranges from any lower limit to any upper limit. The blends may comprise from about 15 to about 70 wt % PBE, or from about 20 to about 60 wt % PBE, or from about 20 to about 55 wt % PBE, or from about 25 to about 55 wt % PBE, or from about 30 to about 55 wt % PBE, or from about 35 to about 50 wt % PBE, where desirable ranges may include ranges from any lower limit to any upper limit Stated differently, the blends may comprise greater than about 10 wt % PBE, or greater than about 15 wt % PBE, or greater than about 20 wt % PBE, or greater than about 25 wt % PBE, or greater than about 30 wt % PBE, or greater than about 35 wt % PBE.

In embodiments where the blend comprises a BMWDPP and a PBE, the blend may comprise from about 40 to about 85 wt % BMWDPP, or from about 40 to about 80 wt % BMWDPP, or from about 45 to about 80 wt % BMWDPP, or from about 45 to about 75 wt % BMWDPP, or from about 45 to about 70 wt % BMWDPP, or from about 50 to about 65 wt % BMWDPP, where desirable ranges may include ranges from any lower limit to any upper limit. The blends may comprise from about 15 to about 60 wt % PBE, or from about 20 to about 60 wt % PBE, or from about 20 to about 55 wt % PBE, or from about 25 to about 55 wt % PBE, or from about 30 to about 55 wt % PBE, or from about 35 to about 50 wt % PBE, where desirable ranges may include ranges from any lower limit to any upper limit Stated differently, the blends may comprise greater than about 10 wt % PBE, or greater than about 15 wt % PBE, or greater than about 20 wt % PBE, or greater than about 25 wt % PBE, or greater than about 30 wt % PBE, or greater than about 35 wt % PBE.

A variety of additives may be incorporated into the polymer blends described herein, depending upon the intended purpose. For example, when the blends are used to form fibers and nonwoven fabrics, such additives may include but are not limited to, stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. Primary and secondary antioxidants include, for example, hindered phenols, hindered amines, and phosphates. Nucleating agents include, for example, sodium benzoate and talc. Also, to improve crystallization rates, other nucleating agents may also be employed such as Ziegler-Natta olefin products or other highly crystalline polymers. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

Further, in some exemplary embodiments, additives may be incorporated into the polymer blends directly or as part of a masterbatch, i.e., an additive package containing several additives to be added at one time in predetermined proportions. In one or more embodiments herein, the fiber of the present invention further comprise a masterbatch comprising a slip agent. The masterbatch may be added in any suitable amount to accomplish the desired result. For example, a masterbatch comprising a slip additive may be used in an amount ranging from about 0.1 to about 10 wt %, or from about 0.25 to about 7.5 wt %, or from about 0.5 to about 5 wt %, or from about 1 to about 5 wt %, or from about 2 to about 4 wt %, based on the total weight of the polymer blend and the masterbatch. In an embodiment, the masterbatch comprises erucamide as the slip additive.

Fibers, Nonwoven Compositions, and Laminates Prepared from Polymer Blends

The polymer blends described herein are particularly useful in meltspun (e.g., meltblown or spunbond) fibers and nonwoven compositions (e.g., fabrics). As used herein, "meltspun nonwoven composition" refers to a composition having at least one meltspun layer, and does not require that the entire composition be meltspun or nonwoven. In some embodiments, the nonwoven compositions additionally comprise one or more layers positioned on one or both sides of the nonwoven layer(s) comprising the polymer blend. As used herein, "nonwoven" refers to a textile material that has been produced by methods other than weaving. In nonwoven fabrics, the fibers are processed directly into a planar sheet-like fabric structure and then are either bonded chemically, thermally, or interlocked mechanically (or both) to achieve a cohesive fabric.

The present invention is directed not only to fibers and nonwoven compositions, but also to processes for forming nonwoven compositions comprising the polymer blends described herein. In one or more embodiments, such methods comprise the steps of forming a molten polymer composition comprising a blend of at least one ICP or BMWDPP and at least one PBE as described above, and forming fibers comprising the polymer blend. In some embodiments, the methods further comprise forming a nonwoven composition from the fibers.

In some embodiments, the nonwoven composition formed from the ICP/PBE blend or the BMWDPP/PBE blend is employed as a facing layer. The process may then further comprise the steps of forming the facing layer, and then forming a nonwoven elastic layer on the facing layer. For example, the nonwoven elastic layer may be formed by meltspinning or meltblowing a layer of molten polymer onto the facing layer. Optionally, an additional facing layer may then be disposed upon the opposite side of the elastic layer, such that the elastic layer is sandwiched between the facing layers. In one or more embodiments, the elastic layer or layers may comprise a PBE having the composition and properties described above.

In certain embodiments, nonwoven compositions comprising the ICP/PBE or BMWDPP/PBE blends may be described as extensible. "Extensible," as used herein, means any fiber or nonwoven composition that yields or deforms (i.e., stretches) upon application of a force. While many extensible materials are also elastic, the term extensible also encompasses those materials that remain extended or deformed upon removal of the force. Fabric layers containing the blends described herein are useful as extensible facing layers in combination with an elastic core layer, which may be a film or a nonwoven layer. When an extensible facing layer is used in combination with an elastic core layer, the extensible layer may permanently deform when the elastic layer to which it is attached stretches and retracts, creating a wrinkled or textured outer surface which gives an additional soft feel that is particularly suited for articles in which the facing layer is in contact with a wearer's skin.

The fibers and nonwoven compositions of the present invention can be formed by any method known in the art. For example, the nonwoven compositions may be produced by a spunmelt process. In certain embodiments herein, the layer or layers of the nonwoven compositions of the invention are produced by a spunbond process. When the compositions further comprise one or more elastic layers, the elastic layers may be produced by a meltblown process, by a spunbond or spunlace process, or by any other suitable nonwoven process.

Fibers produced from the ICP/PBE blend or the BMWDPP/PBE blend may have a thickness from about 0.5 to about 10 denier, or from about 0.75 to about 8 denier, or from about 1 to about 6 denier, or from about 1 to about 3 denier, where desirable ranges may include ranges from any lower limit to any upper limit. Although commonly referred to in the art and used herein for convenience as an indicator of thickness, denier is more accurately described as the linear mass density of a fiber. A denier is the mass (in grams) of a fiber per 9,000 meters. In practice, measuring 9,000 meters may be both time-consuming and wasteful. Usually, a sample of lesser length (i.e., 900 meters, 90 meters, or any other suitable length) is weighed and the result multiplied by the appropriate factor to obtain the denier of the fiber.

The fiber denier (g/9000 m) of a polypropylene-based fiber can be converted to diameter in microns using the following formula:

$$D = 2\sqrt{\frac{denier}{(0.006432)}}$$

Thus, a 1.0 denier polypropylene fiber would have a diameter of about 12.5 micron and a 2.0 denier polypropylene fiber would have a diameter of 17.6 micron.

In some embodiments, fibers produced from the ICP/PBE blend or the BMWDPP/PBE blend may have a thickness/diameter of from about 5 to 50 μm, or from about 15 to 25 μm, or from about 10 to 20 μm, where desirable ranges may include ranges from any lower limit to any upper limit.

The fibers may be monocomponent fibers or bicomponent fibers. Preferably, the fibers are monocomponent fibers, meaning that the fibers have a consistent composition throughout their cross-section.

The nonwoven layer or layers described herein may be composed primarily of a blend of an ICP or BMWDPP and a PBE as described previously. In some embodiments, the layer that comprises the blend may have a basis weight of less than 50 g/m² ("gsm"), or less than 40 gsm, or less than 30 gsm, or less than 25 gsm, or less than 20 gsm. The layer that comprises the blend may have a basis weight of from about 1 to about 75 g/m² ("gsm"), or from about 2 to about 50 gsm, or from about 5 to about 35 gsm, or from about 7 to about 25 gsm, or from about 10 to about 25 gsm, where desirable ranges may include ranges from any lower limit to any upper limit.

The nonwoven layer that comprises the blend of the ICP or BMWDPP and the PBE may have a tensile strength in the machine direction (MD) from about 5 to about 65 N/5 cm, or from about 7 to about 60 N/5 cm, or from about 10 to about 55 N/5 cm, or from about 10 to about 50 N/5 cm, or from about 15 to about 45 N/5 cm, where desirable ranges may include ranges from any lower limit to any upper limit. Stated differently, the nonwovens may have an MD tensile strength greater than about 5 N/5 cm, or greater than about 10 N/5 cm, or greater than about 15 N/5 cm, or greater than about 20 N/5 cm. In the same or other embodiments, the nonwovens may have a tensile strength in the cross direction (CD) from about 5 to about 55 N/5 cm, or from about 7 to about 50 N/5 cm, or from about 10 to about 45 N/5 cm, or from about 10 to about 40 N/5 cm, or from about 15 to about 35 N/5 cm, where desirable ranges may include ranges from any lower limit to any upper limit. Stated differently, the nonwovens may have an MD tensile strength greater than about 5 N/5 cm, or greater than about 10 N/5 cm, or greater than about 15 N/5 cm, or greater than about 20 N/5 cm. Tensile strength of the fabric is determined in accordance with WSP110.4 (05) using the EDANA ERT 20.2-89 Option B.

The nonwoven layer that comprises the blend of the ICP or BMWDPP and the PBE may have a peak elongation in the machine direction (MD) greater than about 70%, or greater than about 75%, or greater than about 80%, or greater than about 85%, or greater than about 90%, or greater than about 95%, or greater than about 100%, or greater than 120%, or greater than 150%. The nonwoven layer may have a peak elongation in the cross direction (CD) greater than about 100%, or greater than about 110%, or greater than about 115%, or greater than about 120%, or greater than about 150%, or greater than about 200%. Elongation of the fabric is determined in accordance with WSP110.4 (05) using the EDANA ERT 20.2-89 Option B.

In some embodiments, fibers made with the ICP/PBE blend or the BMWDPP/PBE blend may have a peak elongation of greater than 200%, or greater than 225%, or greater than 250%, or greater than 275%, or greater than 300%, or greater than 325%, or greater than 350%, when spun at 1500 m/min. The fiber peak elongation may be measured using a Textechno Statimat M loaded with a Textechno program FPAMO210E. These Textechno products are commercially available from Textechno Herbert Stein GmbH & Co., located in Monchengladbach, Germany. To test the fibers, the fiber is threaded through the ceramic guides on the Statimat M into a pneumatic clamp. The gage length for the fiber being tested is 100 mm. The fiber is pulled at 1270 mm/min until it failed. The force to pull the fiber and the strain of the fiber bundle were recorded until the failure occurred. The "peak elongation" is the elongation at which the maximum force is observed. Five fiber samples are tested and the average is reported.

In addition to good extensibility and elongation, fibers comprising the blends described herein may also be used to produce fabrics that have improved aesthetics. For example, the fabrics may have an improved feel and softness. Without being bound by theory, it is believed that fabrics produced using the blends described herein have lower bending modulus, due to lower crystallinity, which improves the softness or feel of the fabric. Fabrics made from fibers comprising the blends described herein may have improved softness, as measured by a Handle-O-Meter.

In certain embodiments, a 35 g/m² facing layer comprising the blends described herein has a Handle-O-Meter value of less than 60 g, or less than 50 g, or less than 40 g. The softness of a nonwoven fabric may be measured according to the "Handle-O-Meter" test as specified in the operating manual on Handle-O-Meter model number 211-5 from the Thwing-Albert Instrument Co. The Handle-O-Meter reading is in units of grams. The modifications were: (1) two specimens per sample were used; and (2) readings were kept below 100 gram by adjusting the slot width used and the same slot width was used throughout the whole series of samples being compared. The Handle-O-Meter values used throughout have an error of ±25% of the reported value.

As used herein, "meltblown fibers" and "meltblown compositions" (or "meltblown fabrics") refer to fibers formed by extruding a molten thermoplastic material at a certain processing temperature through a plurality of fine, usually circular, die capillaries as molten threads or filaments into high velocity, usually hot, gas streams which attenuate the filaments of molten thermoplastic material to reduce their diameter, which may be to microfiber diameter. Thereafter, the meltblown fibers are carried by the high velocity gas stream and are deposited on a collecting surface to form a web or nonwoven fabric of randomly dispersed meltblown fibers. Such a process is generally described in, for example, U.S. Pat. Nos. 3,849,241 and 6,268,203. The term meltblowing as used herein is meant to encompass the meltspray process.

Commercial meltblown processes utilize extrusion systems having a relatively high throughput, in excess of 0.3 grams per hole per minute ("ghm"), or in excess of 0.4 ghm, or in excess of 0.5 ghm, or in excess of 0.6 ghm, or in excess of 0.7 ghm. The nonwoven compositions of the present invention may be produced using commercial meltblown processes, preferably a high pressure meltblown process available from Biax-Fiberfilm Corporation, or in test or pilot scale processes. In one or more embodiments of the present invention, the fibers used to form the nonwoven compositions are formed using an extrusion system having a throughput rate of from about 0.01 to about 3.0 ghm, or from about 0.1 to about 2.0 ghm, or from about 0.3 to about 1.0 ghm.

In a typical spunbond process, polymer is supplied to a heated extruder to melt and homogenize the polymers. The extruder supplies melted polymer to a spinneret where the polymer is fiberized as passed through fine openings arranged in one or more rows in the spinneret, forming a curtain of filaments. The filaments are usually quenched with air at a low temperature, drawn, usually pneumatically, and deposited on a moving mat, belt or "forming wire" to form the nonwoven composition. See, for example, in U.S. Pat. Nos. 4,340,563; 3,692,618; 3,802,817; 3,338,992; 3,341,394; 3,502,763; and 3,542,615. The term spunbond as used herein is meant to include spunlace processes, in which the filaments are entangled to form a web using high-speed jets of water (known as "hydroentanglement").

The nonwoven layer that comprises the blend of the ICP or BMWDPP and the PBE described herein may be a single layer, or may be part of a multilayer laminate. One application is to make a laminate (or "composite") from meltblown ("M") and spunbond ("S") nonwoven compositions, which combines the advantages of strength from the spunbonded component and greater bather properties of the meltblown component. In such applications, the nonwoven layer that comprises the blend of the ICP or BMWDPP and the PBE may be particularly useful as an outer spunbond layer. A typical laminate or composite has three or more layers, a meltblown layer(s) sandwiched between two or more spunbonded layers, or "SMS" nonwoven composites. Examples of other combinations are SSMMSS, SMMS, and SMMSS composites. Composites can also be made of the meltblown or spunbond nonwovens of the invention with other materials, either synthetic or natural, to produce useful articles.

In certain embodiments, a nonwoven laminate composition may comprise one or more elastic layers comprising a PBE and further comprise one or more facing layers comprising the ICP/PBE blend or the BMWDPP/PBE blend as described herein positioned on one or both sides of the elastic layer(s). In some embodiments, the elastic layers and the facing layers may be produced in a single integrated process, preferably a continuous process. For example, a spunmelt process line may incorporate meltblown technology such that multilayer nonwoven laminates are produced that contain one or more meltblown elastic layers laminated to one or more other spunbond layers (which may be elastic or inelastic) in a single continuous integrated process.

The nonwoven products described above may be used in many articles such as hygiene products including, but not limited to, diapers, feminine care products, and adult incontinent products. The nonwoven products may be useful in diaper applications, and may be particularly useful in the elastic ear of the diaper. The nonwoven products may also be used in medical products such as sterile wrap, isolation gowns, operating room gowns, surgical gowns, surgical drapes, first aid dressings, and other disposable items. In particular the nonwoven products may be useful as facing layers for medical gowns, and allow for extensibility in the elbow area of the gown. The nonwoven products may also be useful in disposable protective clothing, and may add toughness to elbow and knee regions of such clothing. The nonwoven products may also be useful as protective wrapping, packaging or wound care. The nonwoven products may also be useful in geotextile applications, as the fabric may have improved puncture resistance in that the fabric will deform instead of puncture.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The following test methods were used in the Examples.

The melt flow rate (MFR) of the polymer samples was measured according to ASTM D-1238, Condition L, at 230° C. using a 2.16 kg load. The MFR is reported in "g/10 min."

The MWD distribution was measured by GPC as described above.

The intrinsic viscosity (IV) was measured according to ASTM D1601 standard, using a decalin solvent at 135° C. The IV is reported in "dl/g".

Fiber elongation and tenacity were measured using a Textechno Statimat M loaded with a Textechno program FPAMO210E. These Textechno products are commercially available from Textechno Herbert Stein GmbH & Co. located in Monchengladbach, Germany. To test the fibers, the fiber bundle was threaded through ceramic guides on the Statimat M into a pneumatic clamp. The gage length for the fiber bundles being tested is 100 mm.

The tenacity and peak elongation were determined using the Textechno Statimat machine. Each fiber bundle was pulled at 1270 mm/min until it failed. The force to pull the fiber bundle and the strain of the fiber bundle were recorded until the failure occurred. The "tenacity" is the force/denier of the fiber bundle (72-fibers per bundle) and is reported in grams/denier. The "peak elongation" is the elongation at which the maximum force is observed. The "elongation at break" is defined as the elongation at which the measured force drops to 90% of the maximum value or the point at which the fiber bundle breaks, whichever comes first. Five fiber bundle samples are tested and the average is reported.

The ICPs identified in Table 1 were used in the examples. Each ICP used was a reactor blend of a polypropylene homopolymer component (Component A) and an ethylene-propylene copolymer component (Component B). The "ICP MFR" is the MFR of the ICP. The "Comp. A MFR" is the MFR of the polypropylene homopolymer component (Component A) of the ICP. The "Comp. A MWD" is the MWD of the polypropylene homopolymer component (Component A) of the ICP. The "Comp. B IV" is the intrinsic viscosity of the ethylene-propylene copolymer component (Component B). The "Comp. B wt %" is the weight percent of the ethylene-propylene copolymer component (Component B) in the ICP, and is based on the total weight of the ICP. The "Comp. B $C_2$ Content" is the ethylene content of the ethylene-propylene copolymer component (Component B), and is based on the weight of Component B. The "ICP $C_2$ Content" is the total ethylene content of the ICP and is based on the weight of the ICP. The "ICP MWD" is the molecular weight distribution of the ICP.

TABLE 1

ICP Compositions

| ICP Sample # | ICP MFR | Comp. A MFR | Comp. A MWD | Comp. B IV | Comp. B wt % | Comp. B $C_2$ Content (wt %) | ICP $C_2$ Content (wt %) | ICP MWD |
|---|---|---|---|---|---|---|---|---|
| A | 35 | 50 | 3.8 | 2.9 | 21.0 | 52 | 10.9 | 4 |
| B | 35 | 71 | 4 | 2.3 | 18.3 | 50 | 9.1 | 4 |
| C | 30 | 145 | 4 | 3.0 | 26.0 | 56 | 14.6 | 4 |
| E | 31 | 55 | ~6-9 | 2.3 | 16.3 | 46 | 7.4 | 6.3 |
| F | 29 | 129 | ~6-9 | 2.7 | 29.4 | 51 | 15.1 | 6.3 |
| G | 38 | 134 | ~6-9 | 3.2 | 21.7 | 50 | 10.9 | 6.9 |
| H | 45 | 74 | ~6-9 | 1.8 | 18.3 | 48 | 8.7 | 6.6 |
| I | 44 | 76 | ~6-9 | 1.9 | 18.7 | 52 | 9.8 | 6.0 |

Propylene homopolymer samples PP1 and PP2 were also made using the same catalyst as used to make the Component A of the above described ICP E, F, G, H, and I. PP3 is a propylene homopolymer that is commercially available from ExxonMobil Chemical Co. as PP3155. Table 2 identifies the properties of the propylene homopolymer samples.

TABLE 2

Propylene Homopolymers

| PP Sample # | MFR | Mw | Mw/Mn | Mz/Mw |
|---|---|---|---|---|
| PP1 | — | 187,000 | 11.2 | 4.3 |
| PP2 | — | 341,000 | 9.0 | 3.2 |
| PP3 | ~36 | 181,000 | 4.4 | 2.2 |

The PBEs identified in Table 3 were used in the examples. Each PBE used was a reactor blended polymer of a first polymer component and a second polymer component made in parallel solution polymerization reactors. The "$1^{st}$ Comp. $C_2$ Content" is the ethylene content of the first polymer component, based upon the total weight of the propylene-derived and ethylene derived units of the first polymer component. The "$2^{nd}$ Comp. $C_2$ Content" is the ethylene content of the second polymer component, based upon the total weight of the propylene-derived and ethylene derived units of the second polymer component. The "Total $C_2$ Content" is the ethylene content of the PBE, where the percentage by weight is based upon the total weight of the propylene-derived and ethylene derived units of the PBE. The "polysplit" is the weight percentage of the second polymer component, based on the weight of the PBE. The "PBE MWD" is the molecular weight distribution of the PBE. The "PBE MFR" is the melt flow rate of the PBE.

TABLE 3

PBE Compositions

| PBE Sample # | $1^{st}$ Comp. $C_2$ Content (wt %) | $2^{nd}$ Comp. $C_2$ Content (wt %) | Total $C_2$ Content (wt %) | Polysplit | PBE MWD | PBE MFR |
|---|---|---|---|---|---|---|
| X | 16 | 4 | 14.5 | 10 | 2 | 20 |
| Y | 16-17 | 3-4 | 16.0 | 10 | 2 | 3 |
| Z | 14.1 | 8.4 | 13.1 | 10 | 2 | 53 |

Example 1

Fibers were made from polymer blends of an ICP and a PBE were prepared as shown in Table 4. The ICP and the PBE were melt blended together in-line with the fiber spinning machine. In addition to Blend Samples 1-11, fibers were also formed from a comparative material, identified as C1. C1 comprised 100 wt % propylene homopolymer that is commercially available from ExxonMobil Chemical Co. as PP3155.

TABLE 4

Polymer Blends of Example 1

| Blend Sample No. | ICP | ICP, Wt % | PBE | PBE, Wt % | Est. Blend MFR |
|---|---|---|---|---|---|
| 1 | A | 54 | X | 46 | 26 |
| 2 | A | 85 | Y | 15 | 24 |
| 3 | A | 80 | Y | 20 | 21 |
| 4 | A | 75 | Y | 25 | 19 |
| 5 | B | 54 | X | 46 | 24 |
| 6 | C | 54 | X | 46 | 23 |
| 7 | E | 54 | X | 46 | 23 |
| 8 | F | 54 | X | 46 | 22 |
| 9 | G | 54 | X | 46 | 27 |
| 10 | H | 54 | X | 46 | 30 |
| 11 | I | 54 | X | 46 | 29 |

The fibers were partially oriented yarn fibers produced on continuous filament spinning equipment. The fiber spinning machine is commercially available from Hills, Inc., located in West Melbourne, Fla. The fiber spinning machine is of lab scale size with a 2 inch single screw extruder. The spinnerette has 72 capillaries. Each capillary diameter was 0.6 mm. The fibers were spun at a melt temperature of 450° F. (232° C.) and a throughput of 0.6 ghm. Fibers were made at three different spin speeds, 1500 m/min, 2000 m/min, and 2500 m/min. These fiber bundles were collected on a spool, with each fiber bundle containing 72 fibers.

The "speed to break" was then determined by slowly increasing the spinning speed in 25 m/min increments until the fiber bundle breaks. This is repeated three times and the average value is reported. The mechanical maximum spinning speed capability for the machine is 5000 m/min.

The properties of the resulting fiber bundles are shown in Table 5, below. The "Speed to Break" is the maximum spinning speed when the fiber failed/broke and is reported in m/min. The "Pk Elng (1500)", "Pk Elng (2000)", and "Pk Elng (2500)" are the peak elongations of the fibers that were produced at a spinning speed of 1500 m/min, 2000 m/min, and 2500 m/min, respectively. The peak elongation is reported in %. The "Ten (1500)", "Ten (2000)", and "Ten (2500)" are the tenacity of the fibers that were produced at a spinning speed of 1500 m/min, 2000 m/min, and 2500 m/min, respectively. The tenacity is reported in g/denier. The "Denier (1500)", "Denier (2000)", and "Denier (2500)" are the deniers of the fibers that were produced at a spinning speed of 1500 m/min, 2000 m/min, and 2500 m/min, respectively.

TABLE 5

Fiber Properties of Example 1

| Sample # | Speed to Break (m/min) | Pk Elng (1500) | Pk Elng (2000) | Pk Elng (2500) | Ten (1500) | Ten (2000) | Ten (2500) | Denier (1500) | Denier (2000) | Denier (2500) |
|---|---|---|---|---|---|---|---|---|---|---|
| C1 | — | — | — | 152 | — | — | 2.40 | — | — | 154 |
| 1 | 3900 | 188 | 138.5 | 139 | 1.68 | 1.98/1.89 | 2.46 | 252 | 196/196 | 148 |
| 2 | 3700 | 163 | 124 | 104 | 1.29 | 1.34 | 1.63 | 249 | 193 | 150 |
| 3 | — | — | — | — | — | — | — | — | — | — |
| 4 | — | — | — | — | — | — | — | — | — | — |
| 5 | 3520 | 209 | 151 | 143 | 1.48 | 1.95 | 2.29 | 260 | 199 | 150 |
| 6 | 4550 | 181 | 126 | 119 | 1.34 | 1.47 | 1.75 | 258 | 201 | 149 |
| 7 | 3200 | 416 | 367 | 265 | 1.10 | 1.33 | 1.40 | 260 | 199 | 157 |
| 8 | 2200 | 345 | 383 | — | 0.96 | 1.16 | — | 258 | 201 | — |
| 9 | 3200 | 367 | 334 | 255 | 0.95 | 1.18 | 1.32 | 266 | 197 | 158 |
| 10 | 2900 | 376 | 321 | 268 | 1.11 | 1.11 | 1.33 | 258 | 199 | 158 |
| 11 | 2900 | 355 | 285 | 277 | 1.07 | 1.20 | 1.41 | 262 | 198 | 163 |

When Samples 3 and 4 were used, the fibers broke off at the spinface, thus, there is no data reported in Table 5 for these samples.

As reflected in Table 5 and FIG. 1, blending a PBE with an ICP that has a broad MWD homopolypropylene component resulted in fabrics having high peak elongations as compared to fibers made with ICPs that had narrower MWD homopolypropylene components.

Example 2

Fibers were made from polymer blends of an ICP or BMWDPP and a PBE were prepared as shown in Table 6. The ICP or BMWDPP and the PBE were first dry blended together, and then melt mixed in an extruder and pelletized.

The BMWDPP used a homopolypropylene had an MFR of 38 g/10 min, and a MWD of 7-9.

TABLE 6

Polymer Blends of Example 2

| Blend Sample No. | ICP or BMWDPP | ICP or BMWDPP, Wt % | PBE | PBE, Wt % |
|---|---|---|---|---|
| 12 | A | 55 | X | 45 |
| 13 | BMWDPP | 55 | X | 45 |
| 14 | A | 55 | Z | 45 |
| 15 | A | 45 | Z | 55 |
| 16 | A | 35 | Z | 65 |
| 17 | BMWDPP | 55 | Z | 45 |
| 18 | BMWDPP | 45 | Z | 55 |
| 19 | BMWDPP | 35 | Z | 65 |

The pelletized blends were then used to form fibers, as described above in Example 1. In addition to Blend Samples 12-19, fibers were also formed from a comparative material, identified as C1. C1 comprised 100 wt % propylene homopolymer commercially available from ExxonMobil Chemical Co. as PP3155. The properties of the resulting fiber bundles are reported in Table 7.

TABLE 7

Fiber Properties of Example 2

| Sample # | Speed to Break (m/min) | Pk Elng (1500) | Pk Elng (2000) | Pk Elng (2500) | Ten (1500) | Ten (2000) | Ten (2500) | Denier (1500) | Denier (2000) | Denier (2500) |
|---|---|---|---|---|---|---|---|---|---|---|
| C1 | 5000 | 230 | 211 | 169.5 | 2.27 | 2.35 | 2.40 | 256 | 192 | 156 |
| 12 | 4450 | 182 | 131 | 131 | 1.80 | 2.03 | 2.35 | 260 | 192 | 156 |
| 13 | 2400 | 371 | 365 | — | 1.02 | 1.23 | — | 258 | 196 | — |
| 14 | 5000 | 168 | 148 | 118.3 | 1.54 | 1.90 | 1.88 | 254 | 191 | 155 |
| 15 | 4600 | 167 | 138 | 106.2 | 1.64 | 1.90 | 1.90 | 256 | 192 | 157 |
| 16 | 4300 | 140 | 112 | 99.7 | 1.69 | 1.84 | 2.04 | 249 | 191 | 158 |
| 17 | 2300 | 405 | 279 | — | 0.94 | 1.00 | — | 254 | 197 | — |
| 18 | 1850 | 381 | — | — | 0.87 | — | — | 253 | — | — |
| 19 | 1400 | — | — | — | — | — | — | — | — | — |

Figure 2:
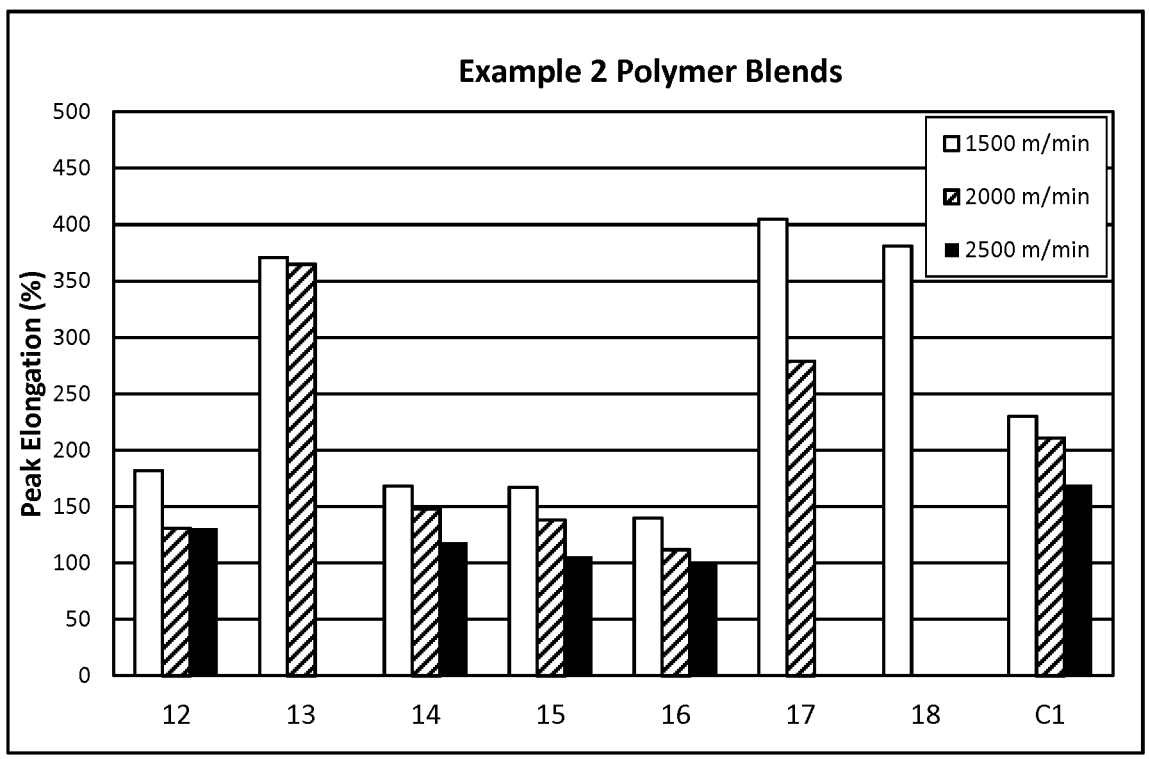
FIG. 2 illustrates the peak elongation of the fibers in Example 2.

As reflected in Table 7 and FIG. 2, blending a PBE with a BMWDPP resulted in fibers having high peak elongations as compared to fibers made with a narrower MWD.

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Having described the various aspects of the compositions herein, further specific embodiments of the invention include those set forth in the following paragraphs.

Embodiment A

A fiber comprising a blend of from about 30 to about 85 wt % of an impact copolymer and from about 15 to about 70 wt % of a propylene-based elastomer, wherein the impact copolymer is a reactor blend and comprises a propylene homopolymer component and a copolymer component, where the propylene homopolymer component has a molecular weight distribution (MWD) of greater than 4.5, and where the copolymer component comprises from about 20 to about 80 wt % propylene-derived units and from about 20 to about 80 wt % ethylene-derived units; and wherein the propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g.

Embodiment B

The fiber of Embodiment A, wherein the fiber comprises from about 20 to about 60 wt % of the propylene-based elastomer.

Embodiment C

The fiber of Embodiment A or B, wherein the fiber comprises from about 35 to about 50 wt % of the propylene-based elastomer.

Embodiment D

The fiber of any one of Embodiments A to C, where the propylene homopolymer component has a MWD of from 4.5 to 15.0.

Embodiment E

The fiber of any one of Embodiments A to D, where the propylene homopolymer component has a MWD of from 4.5 to 12.0.

Embodiment F

The fiber of any one of Embodiments A to E, where the propylene homopolymer component has a MWD of greater than 5.0.

Embodiment G

The fiber of any one of Embodiments A to F, where the propylene homopolymer component has a MWD of from 5.0 to 12.0.

Embodiment H

The fiber of any one of Embodiments A to G, where the propylene homopolymer component has a MWD of from 6.0 to 9.0.

Embodiment I

The fiber of any one of Embodiments A to H, where the copolymer component of the impact copolymer comprises from about 25 to about 75 wt % propylene-derived units and from about 25 to about 75 wt % ethylene-derived units.

Embodiment J

The fiber of any one of Embodiments A to I, where the copolymer component of the impact copolymer comprises from about 30 to about 70 wt % propylene-derived units and from about 30 to about 70 wt % ethylene-derived units.

Embodiment K

The fiber of any one of Embodiments A to J, where the impact copolymer comprises from about 40 to about 95 wt % of the propylene homopolymer component and from about 5 to about 60 wt % of the copolymer component.

Embodiment L

The fiber of any one of Embodiments A to K, where the impact copolymer comprises from about 50 to about 90 wt % of the propylene homopolymer component and from about 10 to about 50 wt % of the copolymer component.

Embodiment M

The fiber of any one of Embodiments A to L, where the impact copolymer has an ethylene content of from about 3 wt % to about 40 wt %, based on the weight of the impact copolymer.

Embodiment N

The fiber of any one of Embodiments A to M, where the impact copolymer has an ethylene content of from about 5 wt % to about 25 wt %, based on the weight of the impact copolymer.

Embodiment O

The fiber of any one of Embodiments A to N, where the propylene-based elastomer is a reactor blend of a first polymer component and a second polymer component.

Embodiment P

The fiber of Embodiment O, where the first polymer component comprises propylene and ethylene and has an ethylene content of greater than about 10 wt %, based on the weight of the first polymer component.

Embodiment Q

The fiber of Embodiment O or P, where the second polymer component comprises propylene and ethylene and has an ethylene content of greater than about 2 wt %, based on the weight of the second polymer component.

Embodiment R

The fiber of any one of Embodiments 0 to Q, where the propylene-based elastomer comprises from about 3 to about 25 wt % of the second polymer component, based on the weight of the propylene-based elastomer.

Embodiment S

The fiber of any one of Embodiments A to R, further comprising a slip additive.

Embodiment T

The fiber of any one of Embodiments A to S, wherein the fiber has a monocomponent structure.

Embodiment U

The fiber of any one of Embodiments A to T, wherein the fiber has a peak elongation of greater than 200%.

Embodiment V

The fiber of any one of Embodiments A to U, wherein the fiber has a peak elongation of greater than 250%.

Embodiment W

The fiber of any one of Embodiments A to V, wherein the fiber has a peak elongation of greater than 300%.

Embodiment AA

A fiber comprising a blend of from about 30 to about 85 wt % of a polypropylene homopolymer having a molecular weight distribution (MWD) of greater than 4.5 and from about 15 to about 70 wt % of a propylene-based elastomer, wherein the propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g.

Embodiment AB

The fiber of Embodiment AA, wherein the fiber comprises from about 20 to about 60 wt % of the propylene-based elastomer.

Embodiment AC

The fiber of Embodiment AA or AB, wherein the fiber comprises from about 35 to about 50 wt % of the propylene-based elastomer.

Embodiment AD

The fiber of any one of Embodiments AA to AC, where the polypropylene homopolymer has a MWD of from 4.5 to 15.0.

Embodiment AE

The fiber of any one of Embodiments AA to AD, where the polypropylene homopolymer has a MWD of from 4.5 to 12.0.

Embodiment AF

The fiber of any one of Embodiments AA to AE, where the polypropylene homopolymer has a MWD of greater than 5.0.

Embodiment AG

The fiber of any one of Embodiments AA to AF, where the polypropylene homopolymer has a MWD of from 5.0 to 12.0.

Embodiment AH

The fiber of any one of Embodiments AA to AG, where the polypropylene homopolymer has a MWD of from 6.0 to 9.0.

Embodiment AI

The fiber of any one of Embodiments AA to AH, where the propylene-based elastomer is a reactor blend of a first polymer component and a second polymer component.

Embodiment AJ

The fiber of Embodiment AI, where the first polymer component comprises propylene and ethylene and has an ethylene content of greater than about 10 wt %, based on the weight of the first polymer component.

Embodiment AK

The fiber of Embodiment AI or AJ, where the second polymer component comprises propylene and ethylene and has an ethylene content of greater than about 2 wt %, based on the weight of the second polymer component.

Embodiment AL

The fiber of any one of Embodiments AI to AK, where the propylene-based elastomer comprises from about 3 to about 25 wt % of the second polymer component, based on the weight of the propylene-based elastomer.

Embodiment AM

The fiber of any one of Embodiments AA to AL, further comprising a slip additive.

Embodiment AN

The fiber of any one of Embodiments AA to AM, wherein the fiber has a monocomponent structure.

Embodiment AO

The fiber of any one of Embodiments AA to AN, wherein the fiber has a peak elongation of greater than 200%.

Embodiment AP

The fiber of any one of Embodiments AA to AO, wherein the fiber has a peak elongation of greater than 250%.

Embodiment AQ

The fiber of any one of Embodiments AA to AP, wherein the fiber has a peak elongation of greater than 300%.

Embodiment AZ

A nonwoven composition comprising one or more fibers according to any one of Embodiments A to W or Embodiments AA to AQ.

Embodiment BA

A nonwoven composition comprising a blend of from about 30 to about 85 wt % of an impact copolymer and from about 15 to about 70 wt % of a propylene-based elastomer, wherein the impact copolymer is a reactor blend and comprises a propylene homopolymer component and a copolymer component, where the propylene homopolymer component has a molecular weight distribution (MWD) of greater than 4.5, and where the copolymer component comprises from about 20 to about 80 wt % propylene-derived units and from about 20 to about 80 wt % ethylene-derived units; and wherein the propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g.

Embodiment BB

The nonwoven composition of Embodiment AZ or BA, where the composition is spunbond.

Embodiment BC

The nonwoven composition of any one of Embodiments AZ to BB, where the composition has a basis weight of less than 50 gsm.

Embodiment BD

The nonwoven composition of any one of Embodiments AZ to BC, where the composition has a basis weight of less than 30 gsm.

Embodiment BE

The nonwoven composition of any one of Embodiments AZ to BD, where the composition has a peak elongation in the cross direction (CD) greater than about 100%.

Embodiment BF

The nonwoven composition of any one of Embodiments AZ to BE, where the composition has a peak elongation in the cross direction (CD) greater than about 150%.

Embodiment CA

A nonwoven laminate comprising an elastic layer and at least one facing layer, wherein the facing layer comprises fibers according to any one of Embodiments A to W or Embodiments AA to AQ.

Embodiment CB

A nonwoven laminate comprising an elastic layer and at least one facing layer, wherein the facing layer comprises a nonwoven composition according to any one of Embodiments AZ through BF.

Embodiment CC

A nonwoven laminate comprising: (i) an elastic layer; and (ii) one or more facing layers, wherein the facing layer comprises from about 30 to about 85 wt % of an impact copolymer and from about 15 to about 70 wt % of a propylene-based elastomer, wherein the impact copolymer is a reactor blend and comprises a propylene homopolymer component and a copolymer component, where the propylene homopolymer component has a molecular weight distribution (MWD) of greater than 4.5, and where the copolymer component comprises from about 20 to about 80 wt % propylene-derived units and from about 20 to about 80 wt % ethylene-derived units; and wherein the propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g.

Embodiment CD

The nonwoven laminate of any one of Embodiments CA to CC, wherein the facing layer comprises from about 25 to about 50 wt % of the propylene-based elastomer.

Embodiment CE

The nonwoven laminate of any one of Embodiments CA to CD, wherein the facing layer further comprises from about 1 to about 5 wt % of a masterbatch comprising a slip additive.

Embodiment CF

The nonwoven laminate of any one of Embodiments CA to CE, wherein the facing layer is formed from monocomponent fibers having a thickness from about 0.5 to about 10 denier.

Embodiment CG

The nonwoven laminate of any one of Embodiments CA to CF, wherein the facing layer is a spunbond nonwoven fabric having a basis weight of less than about 50 gsm.

Embodiment CH

The nonwoven laminate of any one of Embodiments CA to CG, wherein the laminate comprises two facing layers positioned on opposite sides of the elastic layer.

Embodiment CI

The nonwoven laminate of any one of Embodiments CA to CH, wherein the elastic layer is meltblown and each facing layer is spunbond.

Embodiment DA

A process for producing a meltspun, preferably meltblown or spunbond, fiber comprising: (i) forming a polymer blend comprising from about 45 to about 85 wt % of an impact copolymer, where the impact copolymer comprises a blend of from about 40 to about 85 wt % of an impact copolymer and from about 15 to about 60 wt % of a propylene-based elastomer, wherein the impact copolymer is a reactor blend and comprises a propylene homopolymer component and a copolymer component, where the propylene homopolymer component has a molecular weight distribution (MWD) of greater than 4.5, and where the copolymer component comprises from about 20 to about 80 wt % propylene-derived units and from about 20 to about 80 wt % ethylene-derived units; and wherein the propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g; and (ii) forming fibers comprising the polymer blend.

Embodiment DB

The process of Embodiment DA further comprising (iii) forming a nonwoven layer from the fibers.

Embodiment DC

The process of any one of Embodiments DA to DB, wherein the process further comprises forming an elastic nonwoven layer and combining the elastic nonwoven layer with the nonwoven facing layer to form a nonwoven laminate.

Embodiment DD

The process of any one of Embodiments DA to DC, wherein the nonwoven facing layer and the elastic nonwoven layer are produced in a single integrated process.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A fiber comprising a blend of:
   from about 30 to about 85 wt % of an impact copolymer, wherein the impact copolymer has an MFR from about 25 to about 100 g/10 min; and
   from about 15 to about 70 wt % of a propylene-based elastomer, wherein the propylene-based elastomer has an MFR from about 10 g/10 min to about 50 g/10 min,
   wherein the impact copolymer is a reactor blend and comprises a propylene homopolymer component and a copolymer component, where the propylene homopolymer component has a molecular weight distribution (MWD) of greater than 6.0 and less than 9.0, and where the copolymer component comprises from about 20 to about 80 wt % propylene-derived units and from about 20 to about 80 wt % ethylene-derived units; and
   wherein the propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g,
   wherein the fiber has a peak elongation greater than 300% when spun at 1500 m/min as measured by a Textechno Statimat machine.

2. The fiber of claim 1, where the propylene homopolymer component has a Mz/Mw of greater than or equal to 3.0.

3. The fiber of claim 1, where the copolymer component of the impact copolymer comprises from about 25 to about 75 wt % propylene-derived units and from about 25 to about 75 wt % ethylene-derived units.

4. The fiber of claim 1, where the impact copolymer comprises from about 40 to about 95 wt % of the propylene homopolymer component and from about 15 to about 30 wt % of the copolymer component.

5. The fiber of claim 1, where the impact copolymer has an ethylene content of from about 6 wt % to about 20 wt %, based on the weight of the impact copolymer.

6. A nonwoven composition comprising the fibers of claim 1.

7. A nonwoven composition comprising a blend of:
   from about 30 to about 85 wt % of an impact copolymer, wherein the impact copolymer has an MFR from about 25 to about 100 g/10 min; and
   from about 15 to about 70 wt % of a propylene-based elastomer, wherein the propylene-based elastomer has an MFR from about 10 g/10 min to about 50 g/10 min,
   wherein the impact copolymer is a reactor blend and comprises a propylene homopolymer component and a copolymer component, where the propylene homopolymer component has a molecular weight distribution (MWD) of greater than 6.0 and less than 9.0, and where the copolymer component comprises from about 20 to about 80 wt % propylene-derived units and from about 20 to about 80 wt % ethylene-derived units; and
   wherein the propylene-based elastomer comprises propylene and from about 5 to about 25 wt % units derived from one or more $C_2$ or $C_4$-$C_{12}$ alpha-olefins and has a triad tacticity greater than about 90% and a heat of fusion less than about 75 J/g, wherein the composition has a peak elongation in the cross direction (CD) greater than about 100%, and wherein the composition has a peak elongation in the machine direction (MD) greater than about 70%.

8. The nonwoven composition of claim 7, where the composition is spunbond.

9. The nonwoven composition of claim 7, where the composition has a basis weight of less than 50 gsm.

10. A nonwoven laminate comprising an elastic layer and at least one facing layer, wherein the facing layer comprises the nonwoven composition of claim 7.

11. The nonwoven laminate of claim 10, wherein the facing layer further comprises from about 1 to about 5 wt % of a masterbatch comprising a slip additive.

12. The nonwoven laminate of claim 10, wherein the facing layer is formed from monocomponent fibers having a thickness from about 0.5 to about 10 denier.

13. The fiber of claim 1, wherein the fiber has a tenacity of 1.11 g/denier or less.

14. The nonwoven composition of claim 7, wherein the nonwoven composition has a Handle-O-Meter value of less than 60 g.

* * * * *